United States Patent
Ng et al.

(10) Patent No.: US 9,107,213 B2
(45) Date of Patent: Aug. 11, 2015

(54) REFERENCE SIGNAL FOR TIME AND/OR FREQUENCY TRACKING IN A WIRELESS NETWORK

(71) Applicant: Samsung Electronics Co., Ltd., Gyeonggi-do (KR)

(72) Inventors: Boon Loong Ng, Richardson, TX (US); Young-Han Nam, Richardson, TX (US); Juho Lee, Kyeonggi (KR); Jianzhong Zhang, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 157 days.

(21) Appl. No.: 13/670,044

(22) Filed: Nov. 6, 2012

(65) Prior Publication Data

US 2013/0114535 A1 May 9, 2013

Related U.S. Application Data

(60) Provisional application No. 61/557,780, filed on Nov. 9, 2011, provisional application No. 61/563,444, filed on Nov. 23, 2011.

(51) Int. Cl.
*H04W 72/04* (2009.01)
*H04L 5/00* (2006.01)

(52) U.S. Cl.
CPC .......... *H04W 72/0446* (2013.01); *H04L 5/0005* (2013.01); *H04L 5/0051* (2013.01); *H04W 72/042* (2013.01); *H04L 5/0023* (2013.01)

(58) Field of Classification Search
USPC ................ 370/329, 330, 310, 328, 503, 350; 455/450, 464
See application file for complete search history.

(56) References Cited

U.S. PATENT DOCUMENTS

| | | | |
|---|---|---|---|
| 8,660,072 B2* | 2/2014 | Siomina et al. | 370/329 |
| 2007/0133386 A1* | 6/2007 | Kim et al. | 370/203 |
| 2010/0232488 A1 | 9/2010 | Song et al. | |
| 2010/0260154 A1 | 10/2010 | Frank et al. | |
| 2010/0273506 A1* | 10/2010 | Stern-Berkowitz et al. | 455/456.1 |
| 2011/0194551 A1 | 8/2011 | Lee et al. | |
| 2012/0106374 A1* | 5/2012 | Gaal et al. | 370/252 |
| 2012/0120842 A1* | 5/2012 | Kim et al. | 370/252 |
| 2012/0122472 A1* | 5/2012 | Krishnamurthy et al. | 455/456.1 |
| 2012/0264441 A1* | 10/2012 | Chandrasekhar et al. | 455/450 |

FOREIGN PATENT DOCUMENTS

WO    WO 2005/041448 A1    5/2005

OTHER PUBLICATIONS

International Search Report dated Mar. 26, 2013 in connection with International Patent Application No. PCT/KR2012/009467, 3 pages.
Written Opinion of the International Searching Authority dated Mar. 26, 2013 in connection with International Patent Application No. PCT/KR2012/009467, 6 pages.

* cited by examiner

*Primary Examiner* — Habte Mered
*Assistant Examiner* — Rownak Islam

(57) ABSTRACT

A method and an apparatus in a base station are capable of including a tracking reference signal (TRS) in a downlink subframe. The method includes generating a TRS subframe by including the TRS in the downlink subframe at a frequency density of at least one resource element per six resource elements in the TRS subframe. Additionally, the method includes transmitting the TRS subframe at a periodicity among other subframes not including the TRS.

20 Claims, 17 Drawing Sheets

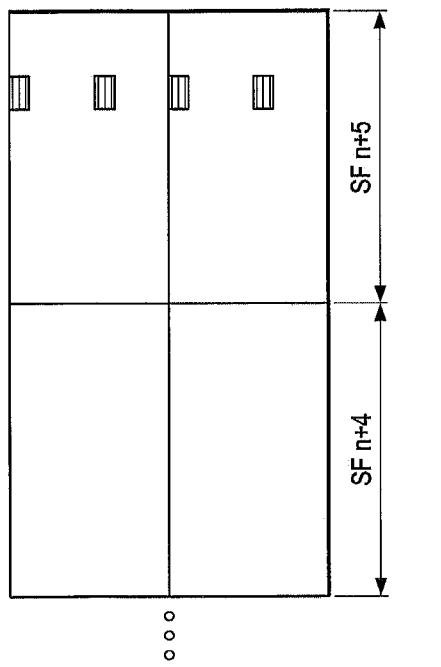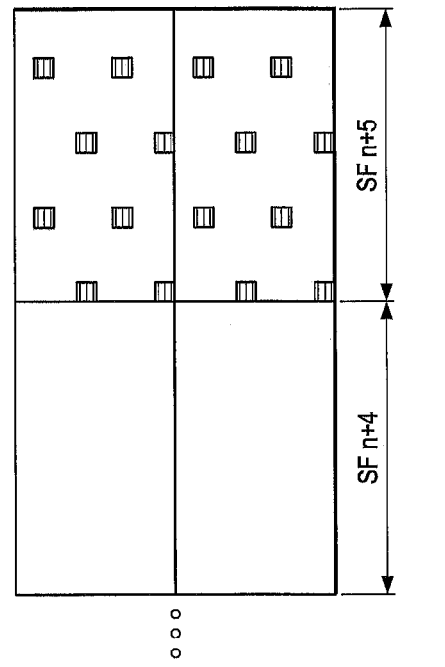
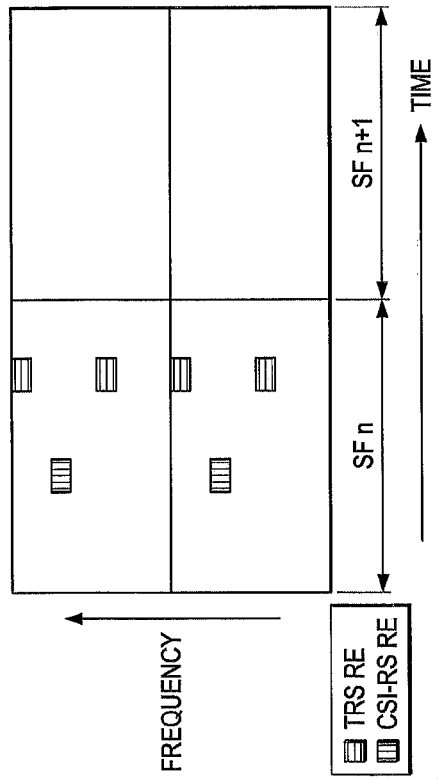
FIG. 11A
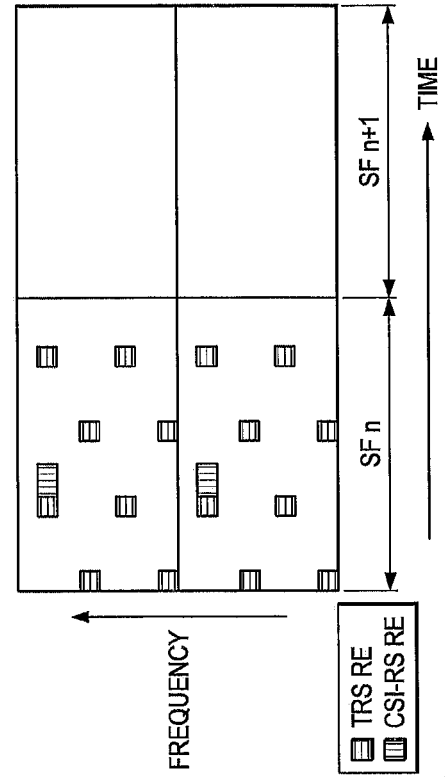
FIG. 11B

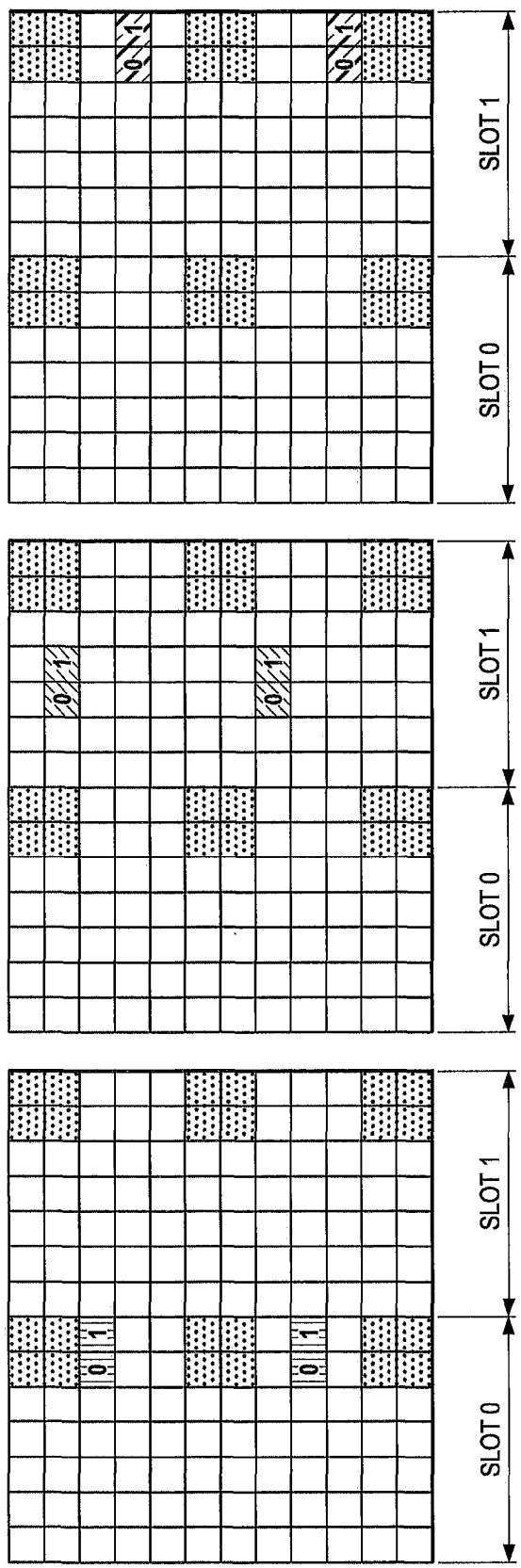

REFERENCE SIGNAL FOR TIME AND/OR FREQUENCY TRACKING IN A WIRELESS NETWORK

CROSS-REFERENCE TO RELATED APPLICATION(S) AND CLAIM OF PRIORITY

The present application claims priority to U.S. Provisional Patent Application Ser. No. 61/557,780 filed Nov. 9, 2011, entitled "DESIGN OF TIME-TRACKING REFERENCE SIGNAL" and U.S. Provisional Patent Application Ser. No. 61/563,444 filed Nov. 23, 2011, entitled "DESIGN OF TIME-TRACKING REFERENCE SIGNAL". The content of the above-identified patent documents is incorporated herein by reference.

TECHNICAL FIELD

The present application relates generally to time and frequency tracking in a wireless network and, more specifically, to a downlink reference signal for time and/or frequency tracking by an user equipment.

BACKGROUND

The following documents and standards descriptions are hereby incorporated into the present disclosure as if fully set forth herein: 3GPP Technical Specification No. 36.300, version 10.3.0 (2011-03); 3GPP Technical Report No. 36.814, version 9.0.0 (2010-03); 3GPP Technical Specification No. 36.321, version 10.2.0 (2011-06); 3GPP Technical Specification No. 36.331, version 10.2.0 (2011-06); 3GPP Technical Specification No. 36.133, version 10.4.0 (2011-09); 3GPP Technical Specification No. 36.331, version 10.3.0 (2011-09); 3GPP Technical Specification No. 36.211, version 10.3.0 (2011-09); and 3GPP Technical Specification No. 36.213, version 10.3.0 (2011-09).

Standards have been proposed to modify existing downlink (DL) carriers in an effort to reduce an amount of bandwidth consumed by signaling overhead. The proposed standards may have a lack of available signals for an user equipment (UE) to achieve time and/or frequency lock with the modified carriers.

Accordingly, there is a need for a downlink reference signal for time and/or frequency tracking by a UE.

SUMMARY

To address the above-discussed issues, it is a primary object to provide, an apparatus and a method in a base station that are capable of including a tracking reference signal (TRS) in a downlink subframe and an apparatus and method in a UE to identify the TRS in the downlink subframe.

A method and an apparatus in a base station are capable of including a tracking reference signal (TRS) in a downlink subframe. The method includes generating a TRS subframe by including the TRS in the downlink subframe at a frequency density of at least one resource element per six resource elements in the TRS subframe. Additionally, the method includes transmitting the TRS subframe at a periodicity among other subframes not including the TRS.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 11A-B illustrate independent TRS and CSI-RS configurations in accordance with various embodiments of the present disclosure;

FIG. 14 illustrates examples of an effective CSI-RS mapping seen by the UE when configured with 2-port CSI-RS+ 2-port CSI-RS in accordance with various embodiments of the present disclosure;

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that standards have been proposed to create an extension carrier that may not be backwards compatible with existing legacy carriers. Generally speaking, one of the goals of the proposed extension carriers is to reduce an amount of overhead signaling. For example, extension carriers may not include certain reference signals such as primary synchronization signals (PSS), secondary synchronization signals (SSS), or cell specific reference signals (CRS).

Embodiments of the present disclosure recognize that lack of these reference signals in the downlink may make it difficult for the UE to achieve time and/or frequency lock with the carrier, maintain time and/or frequency synchronization, and/ or appropriately track the timing and frequency needed for efficient wireless communication. While other signals, such as the channel-state-information, reference signal (CSI-RS) can be used by the UE as a substitute, the release 10 CSI-RS pattern was not designed for time and/or frequency tracking. For example, the frequency density of the CSI-RS in downlink subframes may not be sufficient for maintaining effective timing tracking and the time density of the CSI-RS across downlink subframes may not be sufficient for maintaining effective frequency tracking.

Accordingly, embodiments of the present disclosure provide a tracking reference signal (TRS) that can be used by the UE to achieve and/or maintain timing and/or frequency tracking and/or synchronization. The TRS is included in a downlink subframe at a frequency and time density sufficient enough for a UE to track timing and/or frequency of efficient downlink and uplink communications.

Figure 1:
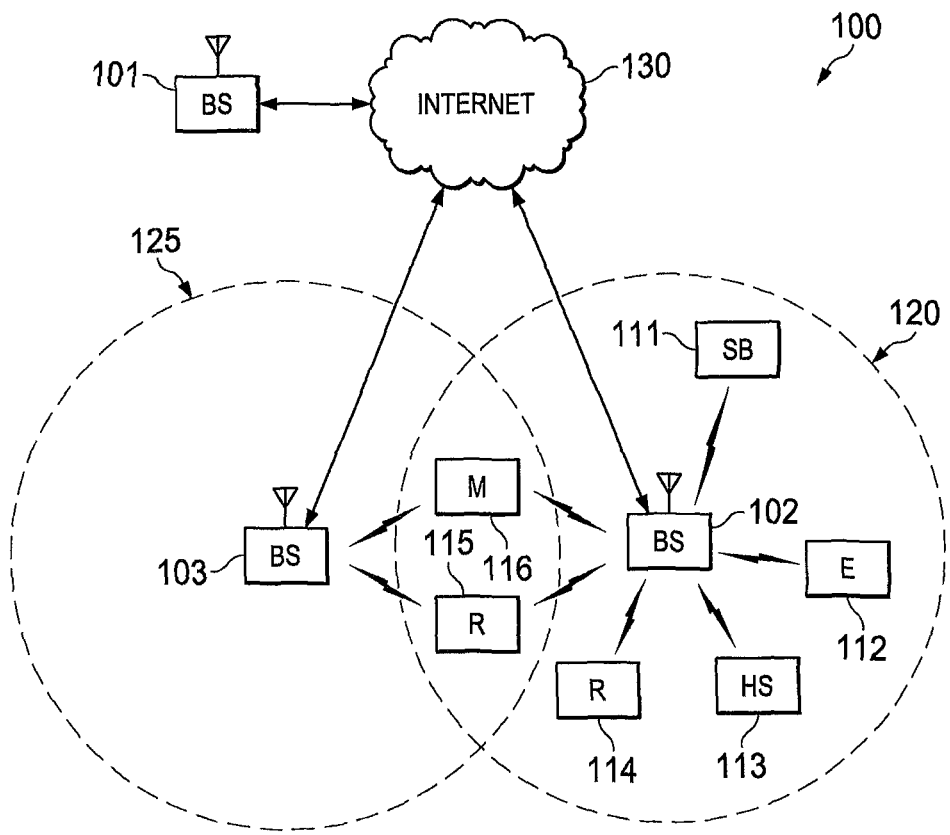
FIG. 1 illustrates an exemplary wireless system which transmits messages in accordance with an illustrative embodiment of the present disclosure.
Figure 2:
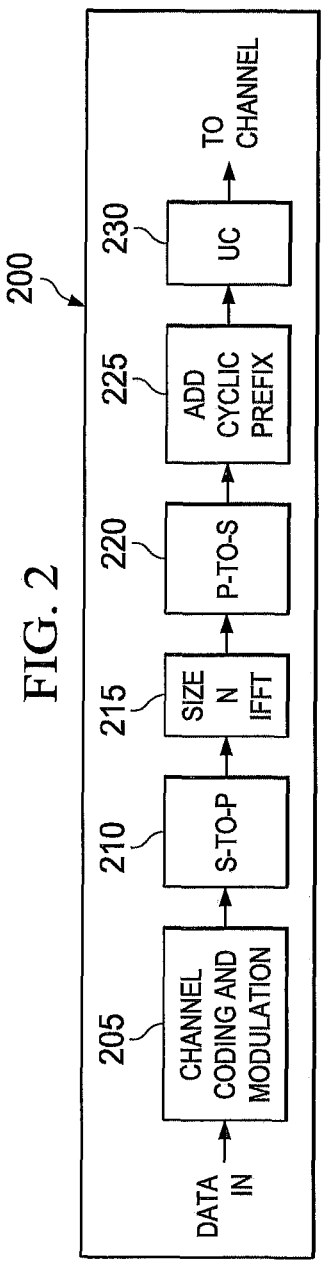
FIG. 2 illustrates a high-level diagram of an orthogonal frequency division multiple access transmit path in accordance with an illustrative embodiment of the present disclosure.
Figure 3:
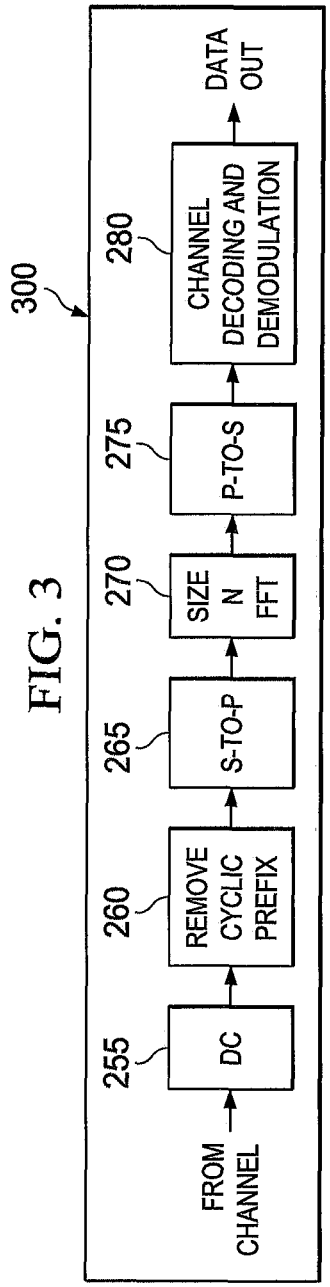
FIG. 3 illustrates a high-level diagram of an orthogonal frequency division multiple access receive path in accordance with an illustrative embodiment of the present disclosure.

FIGS. 1-3 below describe various embodiments implemented in wireless communications systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of user equipment (e.g., mobile phone, mobile station, subscriber station) within coverage area 120 of base station 102. The first plurality of user equipment includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless laptop, a wireless PDA, or the like.

Base station 103 provides wireless broadband access (via base station 101) to Internet 130 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipment are depicted in FIG. 1, it is understood that wireless system 100 may provide wireless broadband access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access voice, data, video, video conferencing, and/or other broadband services via Internet 130. In an exemplary embodiment, one or more of user equipment 111-116 may be associated with an access point (AP) of a WiFi WLAN. User equipment 116 may be any of a number of mobile devices, including a wireless-enabled laptop computer, personal data assistant, notebook, handheld device, or other wireless-enabled device. User equipment 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a user equipment (e.g. user equipment 116 of FIG. 1). In other examples, for uplink communication, the receive path circuitry 300 may be implemented in a base station (e.g. base station 102 of FIG. 1) or a relay station, and the transmit path circuitry 200 may be implemented in a user equipment (e.g. user equipment 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to base stations 101-103 and may implement a receive path corresponding to the architecture for receiving in the downlink from base stations 101-103.

Figure 4:
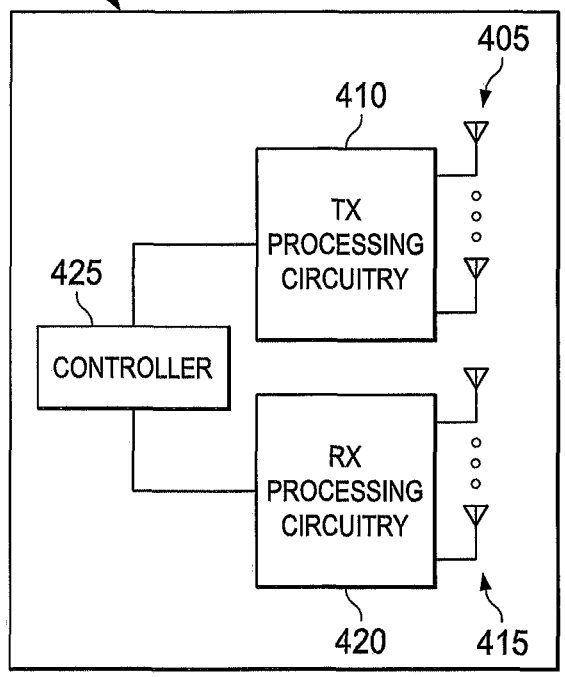
FIG. 4 illustrates a block diagram of a node in a wireless communication system that may be used to implement various embodiments of the present disclosure.

FIG. 4 illustrates a block diagram of a node 400 in a wireless communication system that may be used to implement various embodiments of the present disclosure. In this illustrative example, the node 400 is a device at a communication point in a wireless communications system, such as, for example, wireless system 100 in FIG. 1. The node 400 may be a base station or an user equipment (e.g., mobile station, subscriber station, etc.). In one example, the node 400 is an example of one embodiment of the user equipment 116 in FIG. 1. In another example, the node 400 is an example of one embodiment of the base station 102 in FIG. 1. Node 400 comprises transmit (TX) antennas 405, transmit (TX) processing circuitry 410, receive (Rx) antennas 415, and receive (Rx) processing circuitry 420 and controller 425.

TX processing circuitry 410 receives analog or digital signals from outgoing baseband data. TX processing circuitry 410 encodes, multiplexes, and/or digitizes the outgoing baseband data to produce a processed RF signal that is transmitted via TX antennas 405. For example, the TX processing circuitry 410 may implement a transmit path that is analogous to the transmit processing circuitry 200 in FIG. 2. TX processing circuitry 410 may also perform spatial multiplexing via layer mapping to different antennas in TX antennas 405 and different ports of antennas in TX antennas 405.

Rx processing circuitry 420 receives from Rx antennas 415 an incoming RF signal or signals transmitted by one or more transmission points, such as base stations, relay stations, remote radio heads, user equipment, etc. Rx processing circuitry 420 processes the received signal(s) to identify the information transmitted by the transmission point(s). For example, the Rx processing circuitry 420 may down-convert the incoming RF signal(s) to produce an intermediate frequency (IF) or a baseband signal by channel estimation, demodulating, stream separating, filtering, decoding, and/or digitizing the received signal(s). For example, the Rx processing circuitry 420 may implement a receive path that is analogous to the receive processing circuitry 300 in FIG. 3.

Controller 425 controls the overall operation of node 400. In one such operation, controller 425 controls the reception of channel signals and the transmission of channel signals by Rx processing circuitry 420 and TX processing circuitry 410, in accordance with well-known principles.

The embodiment of node 400 illustrated in FIG. 4 is for illustration only. Other embodiments of the node 400 could be used without departing from the scope of this disclosure. For example, the antennas in the TX and Rx antenna arrays may overlap or be the same antenna arrays used for transmission and reception via one or more antenna switching mechanisms.

In accordance with various embodiments of the present disclosure, CSI-RS with enhanced frequency density can be configured to a UE, such that for each CSI-RS port configured by a CSI-RS configuration the frequency density is higher than one resource element (RE) in every 12 REs. For example, in some embodiments, the frequency density is one CSI-RS for every 6 REs, etc. Frequency density is the number of REs in the frequency domain for a given set of frequencies, such as in a subframe.

Additionally, the various embodiments recognize that keeping a regular spacing between the CSI-RS REs while increasing the frequency density may be advantageous. For example, in some embodiments, 1 or 2 port CSI-RS are mapped onto REs of a legacy (e.g., Rel-10) 4-port CSI-RS pattern, and that 4 port CSI-RS are mapped onto REs of a legacy (e.g., Rel-10) 8-port CSI-RS pattern.

Figure 5:
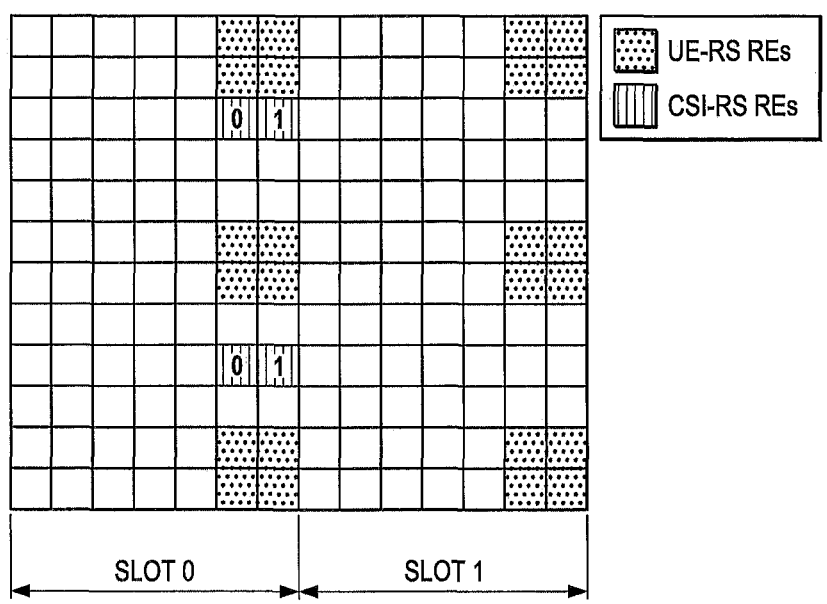
FIG. 5 illustrates a TRS/CSI-RS pattern based on CSI-RS port 0, 1 with enhanced frequency density in accordance with various embodiments of the present disclosure.

FIG. 5 illustrates a TRS/CSI-RS pattern based on CSI-RS port 0, 1 with enhanced frequency density in accordance with various embodiments of the present disclosure. In this illustrative embodiment, 1 or 2 port CSI-RS with enhanced frequency density are mapped onto REs of a legacy (e.g., Rel-10) 4-port CSI-RS pattern, by replacing port-2 CSI-RS in the legacy pattern with port-0 CSI-RS and by replacing port-3 CSI-RS in the legacy pattern with port-1 CSI-RS, as depicted in FIG. 5.

Figure 6:
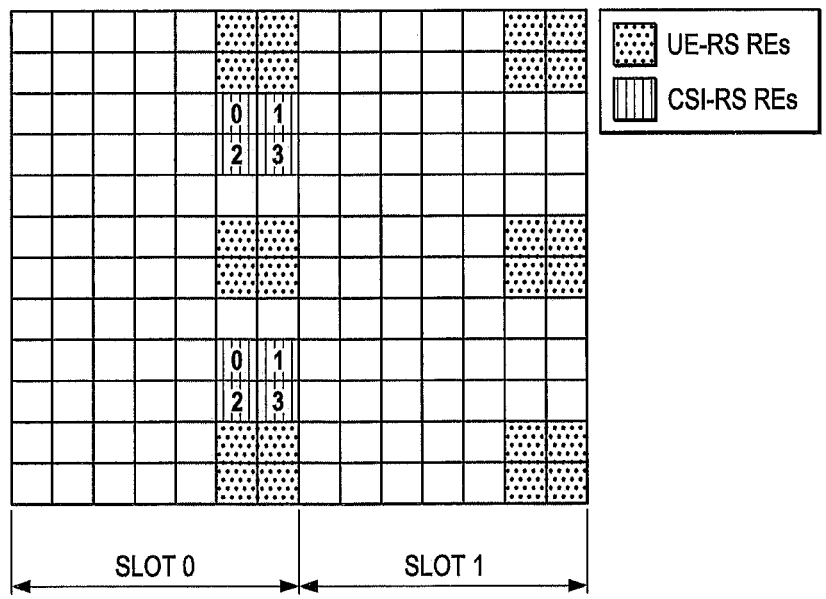
FIG. 6 illustrates a TRS/CSI-RS pattern based on CSI-RS port 0, 1, 2 and 3 with enhanced frequency density in accordance with various embodiments of the present disclosure.

FIG. 6 illustrates a TRS/CSI-RS pattern based on CSI-RS port 0, 1, 2, and 3 with enhanced frequency density in accordance with various embodiments of the present disclosure. In this illustrative embodiment, four port CSI-RS with enhanced frequency density are mapped onto REs of a legacy (e.g., Rel-10) 8-port CSI-RS pattern, by replacing port-2 CSI-RS in the legacy pattern with port-0 CSI-RS, by replacing port-3 CSI-RS in the legacy pattern with port-1 CSI-RS, by replacing port-4 and port-5 CSI-RS in the legacy pattern with port-2 and port-3 CSI-RS, respectively, and by replacing port-6 and port-7 CSI-RS in the legacy pattern with port-2 and port-3 CSI-RS, respectively, as depicted in FIG. 6. In some embodiments, the frequency density of the 8 CSI-RS port may be sufficient for time and/or frequency tacking.

By defining the CSI-RS with enhanced frequency density this way, the network, a base station, or the node 400 in FIG. 4 (e.g., an eNodeB) can configure CSI-RS with enhanced frequency density as if the new CSI-RS were a 4 or 8 port legacy CSI-RS. Hence, the network can flexibly configure both the new CSI-RS and the legacy CSI-RS in the same system without too much interference with the legacy operation. This configured CSI-RS can be used for timing tracking, frequency tracking as well as CSI measurement and reference signal received power (RSRP) measurement.

To enable flexible CSI-RS assignment, the present disclosure provides that the network is capable to indicate a UE of whether a configured CSI-RS is with enhanced frequency density or not. In one example, each CSI-RS configuration may include a one-bit information field which may be called, for example, a CSI-RS density information field, for this purpose as in Table 1. The single bit field and the table are examples and other densities, such as 3 REs/physical resource block (PRB) or 4 REs/PRB, can be similarly signaled.

TABLE 1

CSI-RS density information by one-bit field

| CSI-RS density information field | CSI-RS density |
| --- | --- |
| 0 | 1 RE per PRB, as in Rel-10 specification |
| 1 | 2 REs per PRB, as in this embodiment |

In another example, the CSI-RS density information may be implicitly indicated by the carrier type. For example, CSI-RS, if configured, has enhanced frequency density if the carrier is an extension carrier. Otherwise, it follows Rel-10 specification, as in Table 2 below.

TABLE 2

CSI-RS density information by carrier type

| Carrier type | CSI-RS density information | CSI-RS density |
| --- | --- | --- |
| Backward-compatible carrier | 0 | 1 RE per PRB, as in Rel-10 specification |
| Non-backward compatible carrier (e.g. extension carrier) | 1 | 2 REs per PRB, as in this embodiment |

Depending on the value of CSI-RS density information, a UE may interpret at least one of the other CSI-RS configuration information fields, (e.g., resourceConfig, subframeConfig, antennaPortCount). For example, when CSI-RS density information value is zero, the UE interprets resourceConfig, subframeConfig and antennaPortCount, according to Rel-10 specification. However, when CSI-RS density information value is 1, the UE interprets resourceConfig differently from Rel-10.

For example, in some embodiments, the CSI-RS pattern with enhanced frequency density applies only when antennaPortCount is less than or equal to four. For example, when antennaPortCount is either 1 or 2, the UE reads the second column (i.e., the column for legacy 4-port CSI-RS) of resourceConfig table (e.g., Table 3 provided below) to identify the CSI-RS pattern with enhanced frequency density.

TABLE 3

Mapping from CSI reference signal configuration to (k', l') for normal cyclic prefix.

| | CSI reference signal Configuration (resourceConfig) | Number of CSI reference signals configured | | | | | |
| --- | --- | --- | --- | --- | --- | --- | --- |
| | | 1 or 2 | | 4 | | 8 | |
| | | (k', l') | $N_s$ mod 2 | (k', l') | $N_s$ mod 2 | (k', l') | $N_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |

TABLE 3-continued

Mapping from CSI reference signal configuration to (k', l') for normal cyclic prefix.

| | CSI reference signal Configuration (resourceConfig) | Number of CSI reference signals configured | | | | | |
|---|---|---|---|---|---|---|---|
| | | 1 or 2 | | 4 | | 8 | |
| | | (k', l') | $N_s$ mod 2 | (k', l') | $N_s$ mod 2 | (k', l') | $N_s$ mod 2 |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

In an example where antennaPortCount is four, the UE reads the third column (i.e., the column for legacy 8-port CSI-RS) of resourceConfig table (e.g., Table 3 above) to figure out the CSI-RS pattern with enhanced frequency density. In an example where the antennaPortCount is eight, the UE reads the third column of resourceConfig table (e.g., Table 3 above) to figure out the CSI-RS pattern.

In other embodiments, the CSI-RS pattern with enhanced frequency density may only apply when antennaPortCount is less than or equal to two. For example, when antennaPortCount is either one or two, the UE reads the second column (i.e., the column for legacy 4-port CSI-RS) of resourceConfig table (e.g., Table 3 above) to figure out the CSI-RS pattern with enhanced frequency density. In examples where the antennaPortCount is four, the UE reads the second column of resourceConfig table (e.g., Table 3 above) to figure out the CSI-RS pattern. In examples where the antennaPortCount is eight, the UE reads the third column of resourceConfig table (e.g., Table 3 above) to figure out the CSI-RS pattern.

With respect to the sequence for CSI-RS with enhanced frequency density, there are at least two contemplated embodiments for generating the sequence and applying the mapping to the resource grid.

Figure 7:
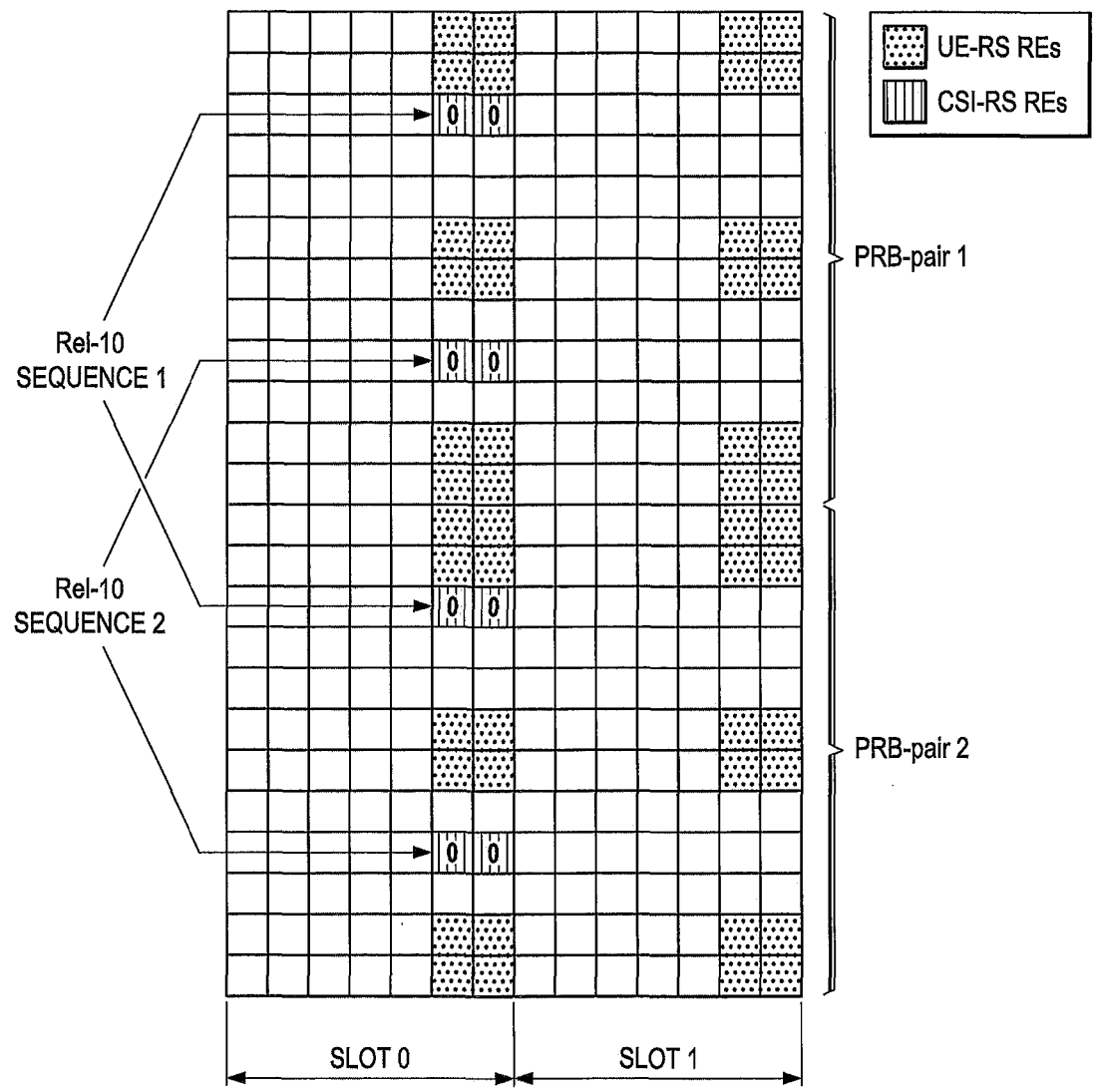
FIG. 7 illustrates sequence generation and mapping for CSI-RS with enhanced frequency density in accordance with one embodiment of the present disclosure.

FIG. 7 illustrates sequence generation and mapping for CSI-RS with enhanced frequency density in accordance with an embodiment of the present disclosure. In this illustrative embodiment, the sequence is defined as in Rel-10, but the same sequence is mapped n times repeatedly in the Rel-10 manner in the subframe, where n is how many times the CSI-RS RE of the same port is mapped in a PRE-pair. This embodiment enables backward compatibility. For example, a Rel-10 UE can interpret the CSI-RS with the legacy frequency density. The network can configure the other set of REs used in the enhanced density pattern as the muted REs or zero-powered CSI-RS for the legacy UEs.

Figure 8:
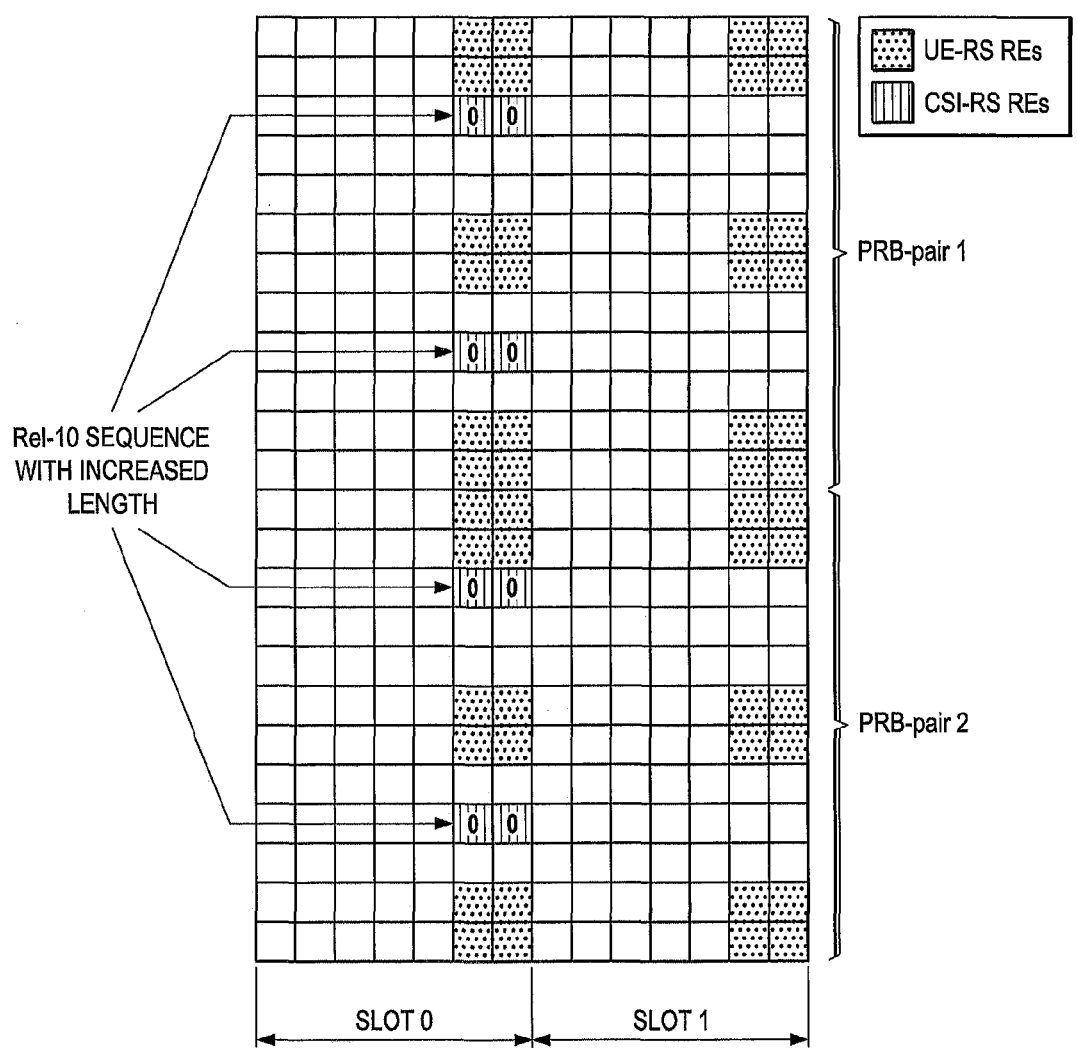
FIG. 8 illustrates sequence generation and mapping for CSI-RS with enhanced frequency density in accordance with another embodiment of the present disclosure.

FIG. 8 illustrates sequence generation and mapping for CSI-RS with enhanced frequency density in accordance with another embodiment of the present disclosure. In this illustrative embodiment, the sequence defined in Rel-10 is modified so that the length of the sequence is increased according to the frequency density increase. For example, if the frequency density is doubled, the sequence length may also be doubled. Equation 1, recited below, provides an example for calculating the length of the sequence in accordance with embodiments of the present disclosure.

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1$$

Equation 1

In addition to the principals of the CSI-RS with enhanced frequency density, embodiments of the present disclosure provide a tacking reference signal (TRS) that can be used by the UE to achieve and/or maintain timing and/or frequency tracking and/or synchronization. In various embodiments, the TRS pattern used for time tracking may include the following characteristics: a wideband signal, a frequency domain density is at least one RE for every six REs, and the spacing between TRS REs may be regular in frequency.

The TRS may be configured when there is a lack of DL signals that can be used by the UE for time tracking purpose. For example, the TRS may be configured for an extension carrier where the CRS may be absent or where the CSI-RS does not have enough frequency and time density for accurate time tracking. In the various embodiments, the number of ports associated with TRS is typically one, but in other embodiments, the more than one port can be associated with TRS.

FIGS. 9A-F illustrate TRS patterns based on the CRS port 0 pattern in accordance with various embodiments. In various embodiments, the TRS port pattern and sequence are the same as that of CRS port 0 but with certain transmission periodicity. For example, the transmission periodicity may be once every 2 ms, 5 ms, 10 ms, etc. or once every 2 subframes, 5 subframes, 10 subframes, etc. In these illustrative examples, the subframe that carries the TRS is referred to as the TRS subframe.

The use of the CRS pattern encourages reuse of existing UE implementation that uses CRS for time and frequency tracking. Not transmitting TRS in every subframe reduces the overhead of TRS and may not have much of an impact on the tracking performance. The subframe index and the periodicity of the TRS subframe can be either fixed or configurable (e.g. by the network, a base station, a radio resource control (RRC)).

Figure 10A:
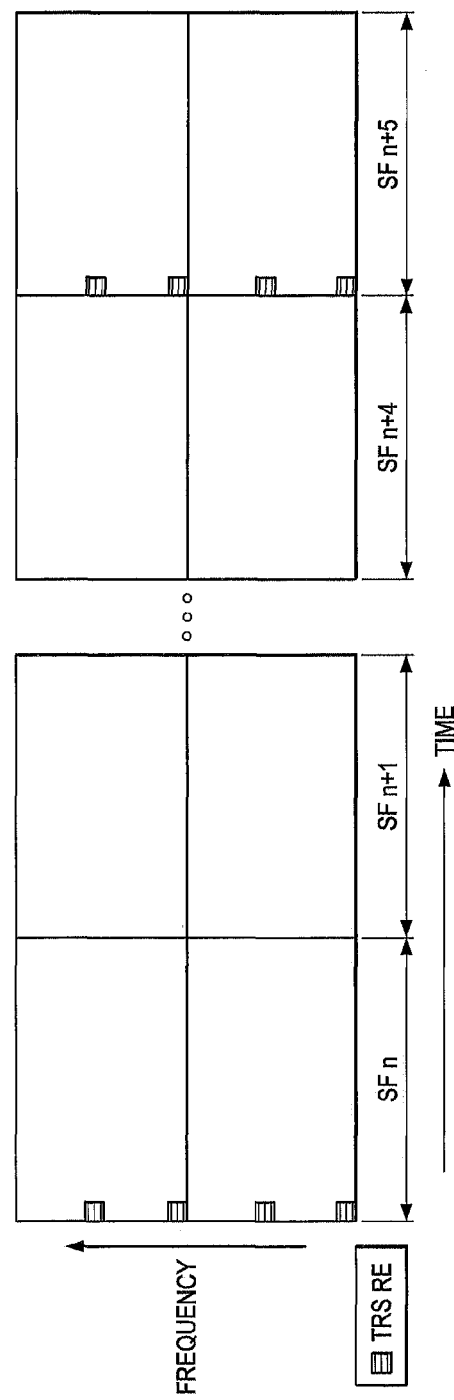
FIGS. 10A-B illustrate periodicity of TRS transmissions in downlink subframes in accordance with various embodiments of the present disclosure.
Figure 10B:
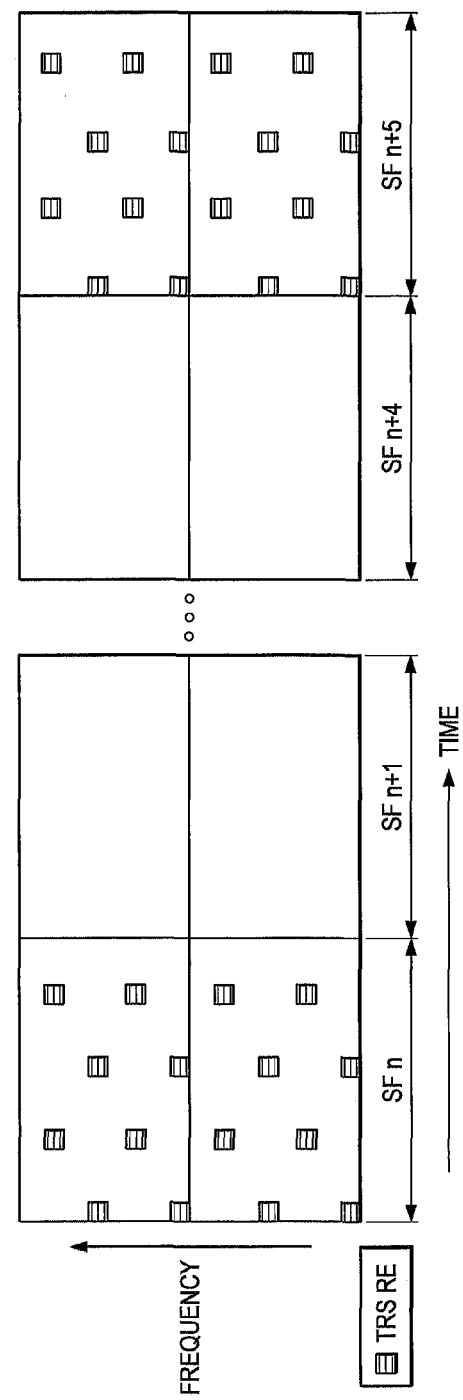

In one example of a fixed configuration, the TRS subframe can be subframe 0 and subframe 5 of every frame (e.g., 5 ms periodicity), as illustrated in FIGS. 10A-B, or subframe 0 of every frame (e.g., 10 ms periodicity). FIG. 10A illustrates a 5 ms periodicity of TRS transmissions where the TRS is transmitted in one OFDM symbol of a subframe (e.g., the first OFDM symbol of a subframe). FIG. 10B illustrates a 5 ms periodicity of TRS transmissions where the TRS is transmitted in all CRS port zero RE locations in a subframe with a 5 ms periodicity (e.g., the TRS pattern is the same as the full CRS port 0 pattern in a subframe).

In one example of configurable TRS transmission, the configuration parameters provided to the UE may include periodicity of the TRS subframe (e.g., 2 ms, 5 ms, 10 ms, 15 ms, etc.) and a subframe offset (e.g., with respect to subframe 0 in a frame). The periodicity and subframe offset may be jointly encoded as subframe configuration information (e.g., similar to CSI-RS subframe configuration).

Figure 9A:
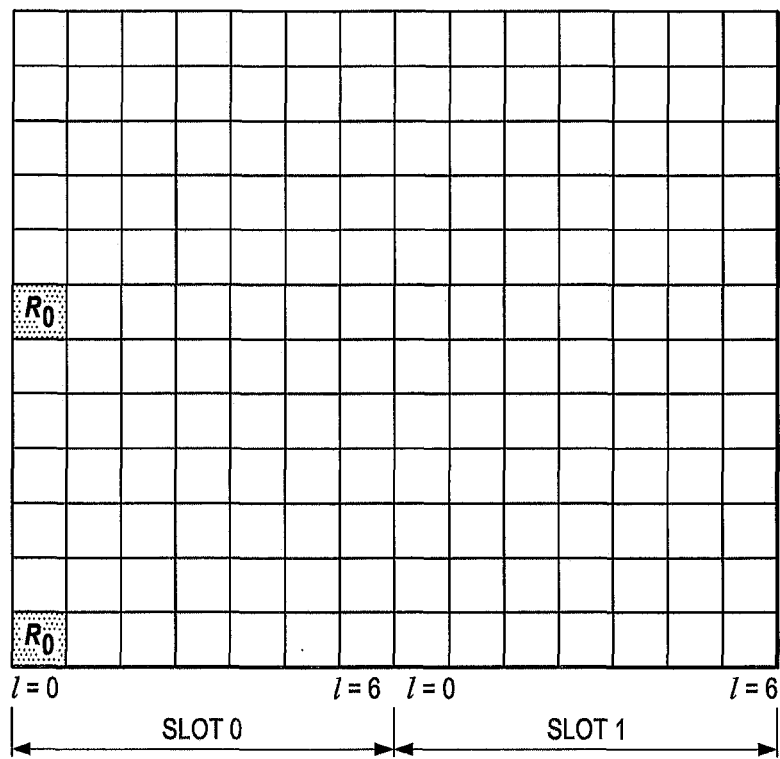
FIGS. 9A-G illustrate TRS patterns based on CRS port 0 pattern in accordance with various embodiments of the present disclosure.

In one example embodiment, the TRS may only be transmitted in one OFDM symbol of a subframe (e.g., the first OFDM symbol of a subframe) as illustrated, for example, in FIG. 9A. This configuration may reduce the overhead of TRS.

Figure 9B:
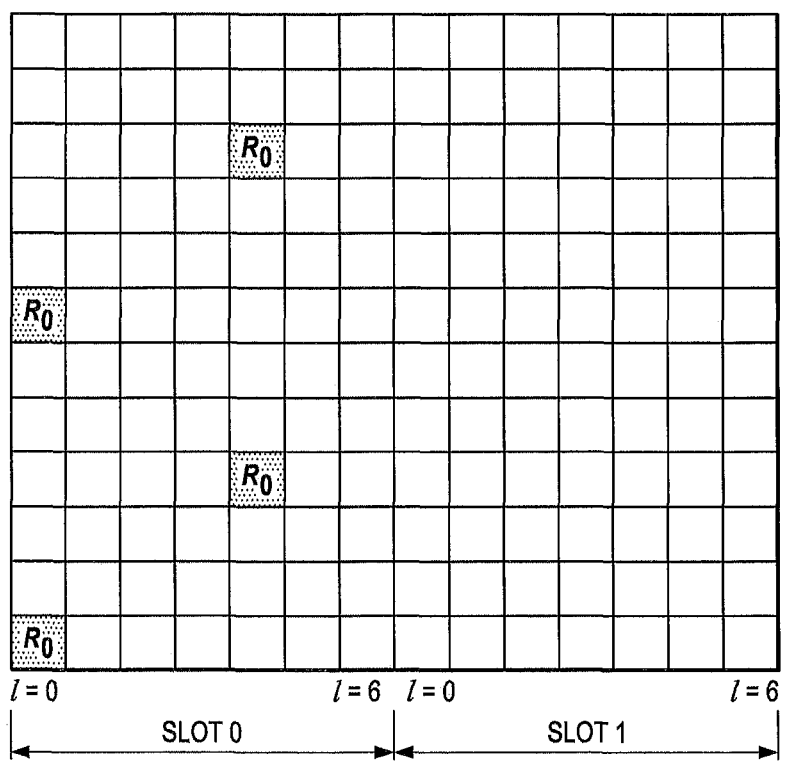

In another example embodiment, the TRS is transmitted in multiple OFDM symbols (e.g., in the CRS port 0 RE locations in the first slot of a subframe) as illustrated, for example, in FIG. 9B. This configuration may enable improved frequency tracking.

Figure 9C:
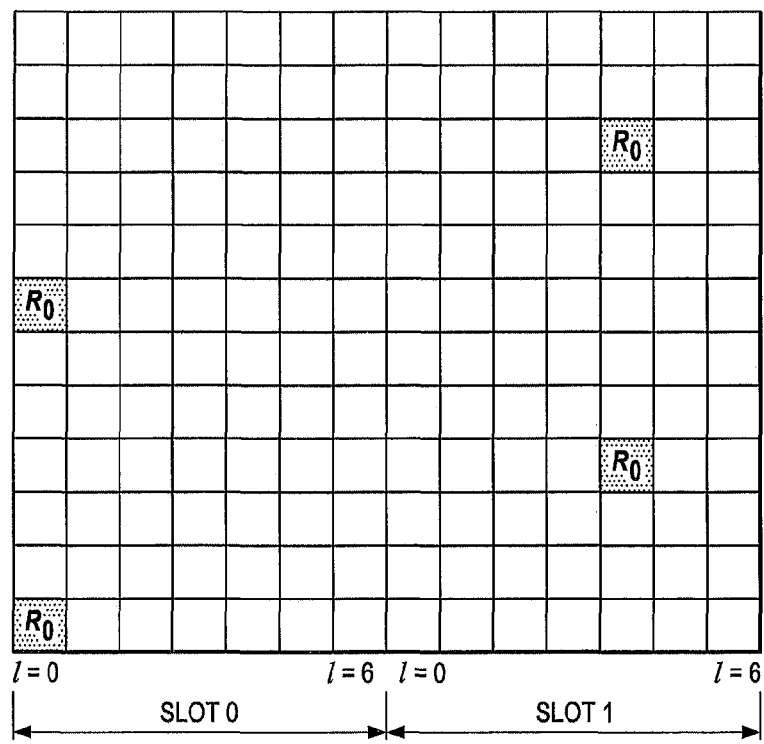

In another example embodiment, the TRS is transmitted in the first OFDM symbol and the last OFDM symbol with CRS in a subframe (e.g., the fifth OFDM symbol in the second slot), as illustrated, for example, in FIG. 9C.

Figure 9D:
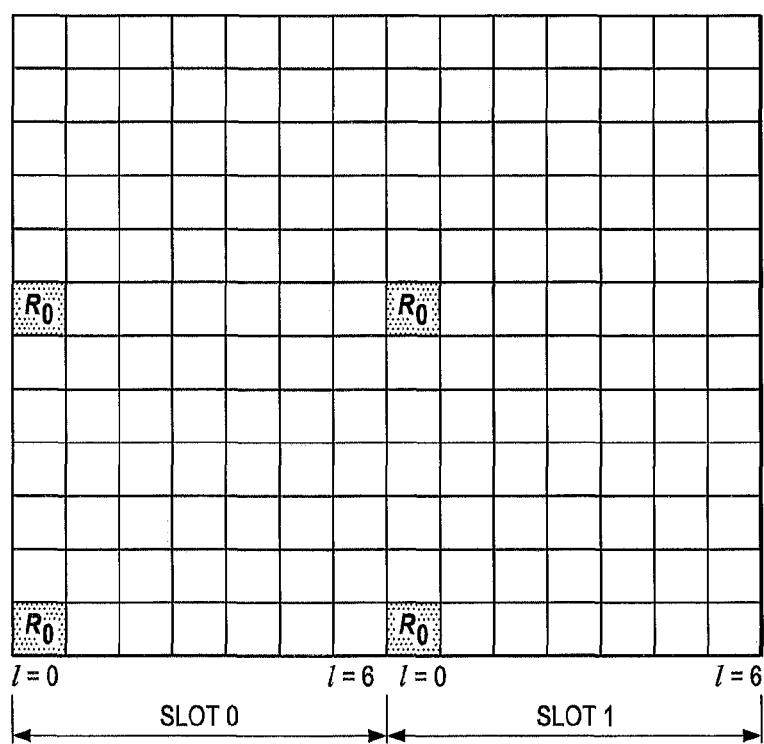
Figure 9E:
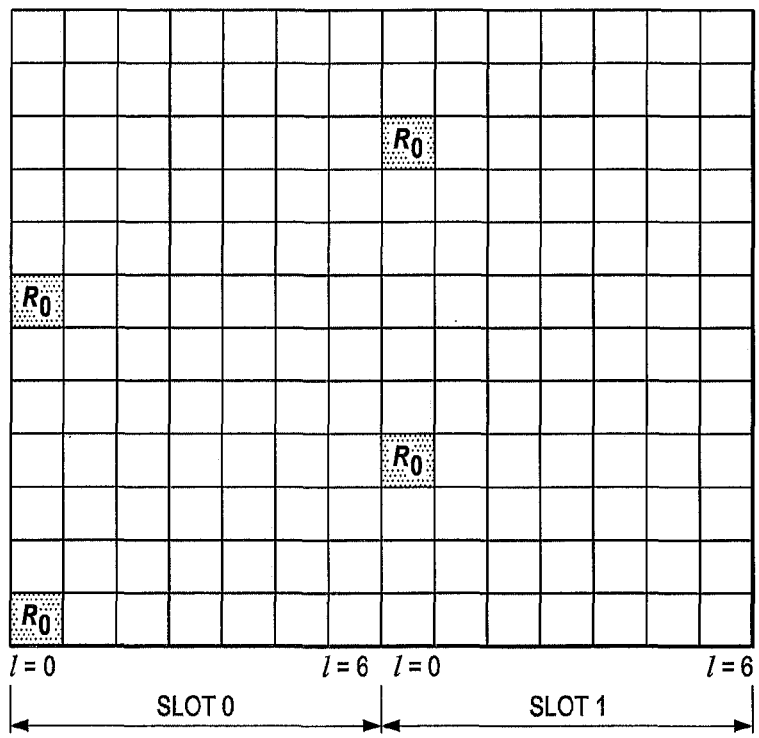
Figure 9F:
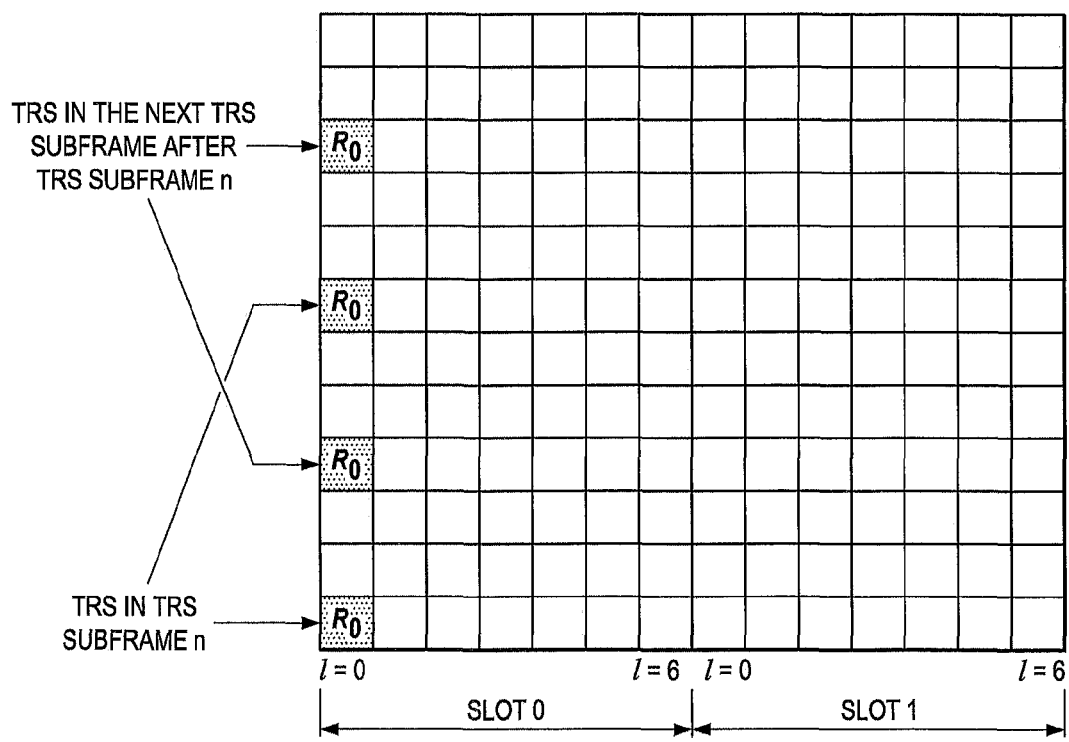

In another example embodiment, the TRS is transmitted in the first OFDM symbol of each time slot, as illustrated, for example, in FIG. 9D.

In another example embodiment, the TRS is transmitted in the first OFDM symbol of each time slot. A frequency offset (e.g. a three RE offset) is applied to the second time slot with respect to the first time slot. Effectively, CRS port 0 of second time slot occupies the location of CRS port 1 in the second time slot, as illustrated, for example, in FIG. 9E.

In another example embodiment, the TRS is transmitted in one OFDM symbol of a subframe (e.g., the first OFDM symbol of a subframe). Frequency offset (e.g., a three RE offset) is applied to every second TRS transmission instance, as illustrated, for example, in FIG. 9F.

Figure 9G:
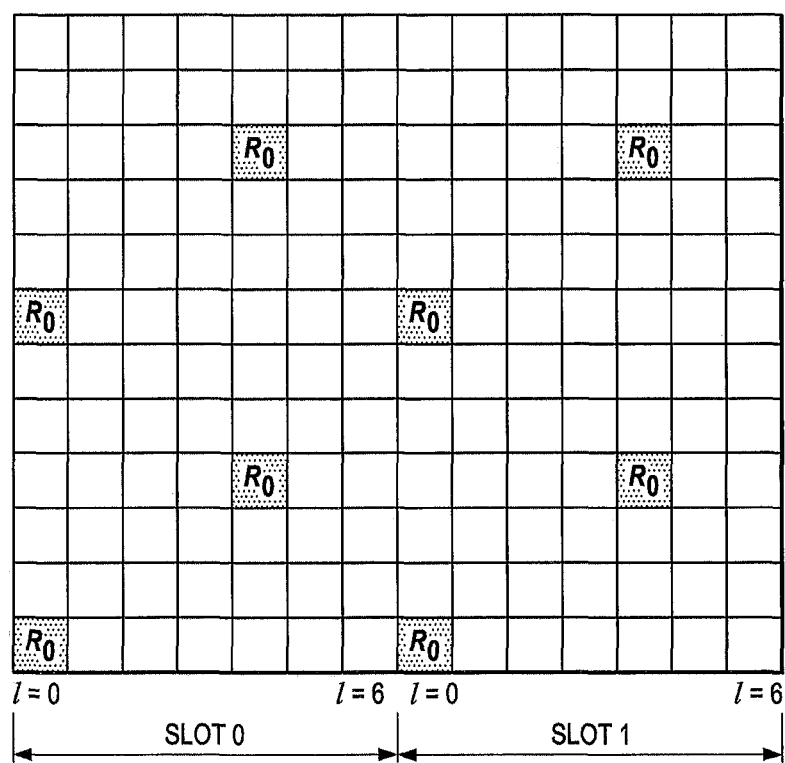

In another example embodiment, the TRS may be transmitted in all CRS port zero RE locations in a subframe (e.g., the TRS pattern is the same as the full CRS port 0 pattern in a subframe) as illustrated, for example, in FIG. 9G.

The present disclosure provides at least two embodiments for mapping the TRS onto the antenna. In one embodiment, the TRS and CSI-RS are mapped independently, and the channel information from one is not derivable from the channel information of the other. This embodiment may be useful when it is desirable to precode the TRS with more physical antennas than there are CSI-RS ports, for example. In another embodiment, the TRS and CSI-RS are inter-related. In this embodiment, TRS can be used to help channel estimation.

While TRS is used primarily for the purpose of time/frequency tracking, the TRS can also be used to improve the channel estimation quality for measurement and CQI/CSI reporting purposes. In order to do this, a mapping between the TRS port and CSI-RS port may be established.

In one example, the UE can assume the same channel for the TRS port and one fixed CSI-RS port (e.g., CSI-RS port 0) in all subframes where TRS is available. This may be described as the TRS being mapped to CSI-RS port 0, and, therefore, the channel estimate of CSI-RS port 0 is enhanced using the TRS. This mapping could be fixed in the specification standards or signaled (e.g., by the RRC) to the UE as a part of the TRS configuration.

In another example, the UE can assume the same channel for the TRS port and one variable CSI-RS port (e.g., CSI-RS port 0, 1, 2, or 3), according to the subframe ID and in a periodic cycling fashion. For example, in a system with four CSI-RS ports, if the TRS is configured for every 5 ms, then the TRS port is mapped to CSI-RS port 0 in subframe #0, port 1 in subframe #5, port 2 in subframe #10, port 3 in subframe #15, and back to CSI-RS port 0 again in subframe #20.

In accordance with various embodiments of the present disclosure, the TRS can be independently configured of CSI-RS configuration. This independent configuration allows flexibility in the configuration of the TRS patterns and sequence. In these embodiments, when a TRS subframe and a CSI-RS subframe collide, collision between TRS REs and CSI-RS REs can be avoided via different resourceConfig configuration. The TRS parameters and the CSI-RS parameters are optimized separately. For example, the TRS may have periodicity of 5 ms for time tracking where the CSI-RS periodicity can be 10 ms, as illustrated, for example, in FIGS. 11A-B.

FIG. 11A illustrates independent TRS and CSI-RS configurations where the TRS is transmitted in one OFDM symbol of a subframe with a 5 ms periodicity (e.g., the first OFDM symbol of a subframe). FIG. 11B illustrates independent TRS and CSI-RS configurations where the TRS is transmitted in all CRS port zero RE locations in a subframe with a 5 ms periodicity (e.g., the TRS pattern is the same as the full CRS port 0 pattern in a subframe).

Figure 12A:
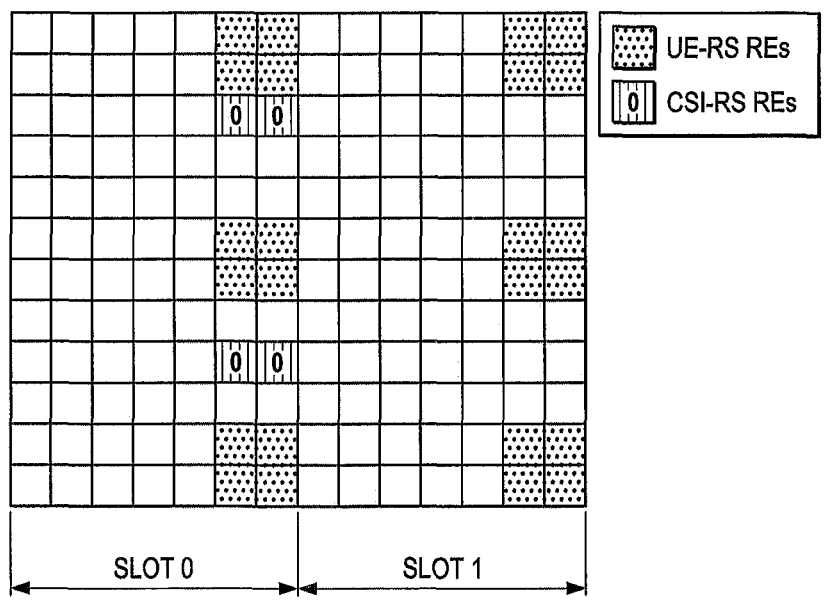
FIGS. 12A-B illustrate a TRS/CSI-RS pattern based on CSI-RS port zero with enhanced frequency density in accordance with various embodiments of the present disclosure.
Figure 12B:
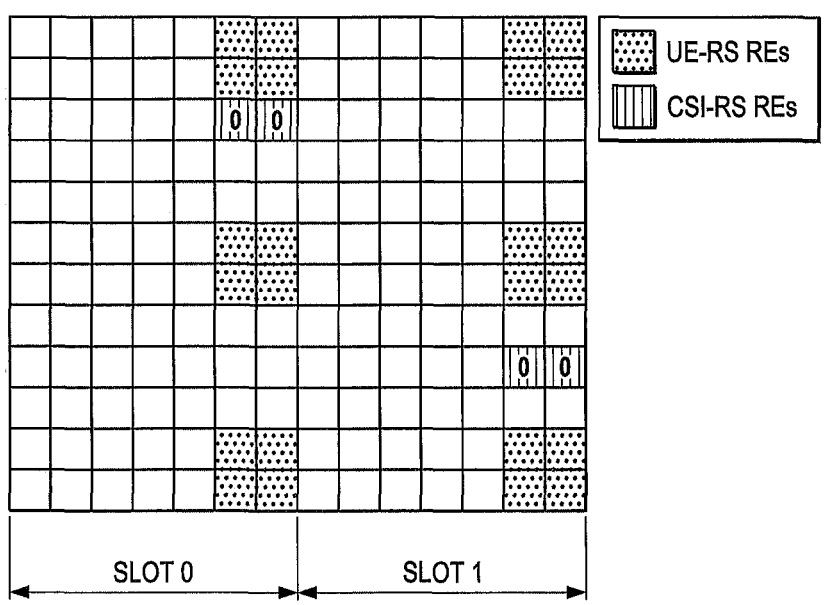

FIGS. 12A-B illustrate a TRS/CSI-RS pattern based on CSI-RS port zero with enhanced frequency density in accordance with the present disclosure. The present disclosure provides at least two example embodiments for the TRS pattern, sequence, and configuration. In one illustrative embodiment, the TRS pattern and sequence can be the same as that of CSI-RS port x where x can be 0, 1, with enhanced frequency density such that, for each TRS port the frequency density is, for example, one per every 6 REs and the spacing between the TRS REs is regular. An example using CSI-RS port zero as the TRS port zero with enhanced frequency density is shown in FIGS. 12A and 12B. In these embodiments, the TRS pattern can be configured similarly to the CSI-RS with enhanced frequency density described above.

In another embodiment, the TRS pattern may be a collection of multiple Rel-10 CSI-RS port 0 or 0/1 patterns. For example, the TRS pattern illustrated in FIG. 12A may be signaled if the base station configures both Pattern 5 (e.g., [k, l]=[8, 5]) and Pattern 11 (e.g., [k, l]=[2, 5]) (for the same subframe) from Table 3 above. In another example, the TRS pattern in FIG. 12B may be signaled if the base station configures both Pattern 5 (e.g., [k, l]=[8, 5]) and Pattern 18 (e.g., [k, l]=[3, 5]) (for the same subframe) from Table 3 above.

Additionally, if there is virtual cell ID in the CSI-RS configuration message, then the virtual cell ID associated with a given TRS may be the same. If the UE receives multiple CSI-RS configurations with the same virtual cell-ID, the UE may perform channel estimation assuming aggregated pattern from all CSI-RS configurations with the same virtual cell ID. The UE can further assume this is for TRS purpose in scenarios where TRS and CSI-RS are independent ports and there is no mapping between the TRS and the CSI-RS port.

In some example deployments, multiple CSI-RS configurations with the same virtual cell-ID may not mean that the corresponding CSI-RSs are transmitted from the same transmission point. In this example, the condition for the UE to assume the configured CSI-RSs are to be used as TRS can be that the UE receives multiple CSI-RS configurations with the same virtual cell-ID at the same time and that the network indicates that the corresponding CSI-RSs can be used as TRS.

In these illustrative embodiments, the configuration parameters of TRS can be the same as that of CSI-RS, i.e., resource configuration (resourceConfig), subframe configuration (subframeConfig), the number of antenna ports (antennaPortCount), etc. AntennaPortCount may be omitted if the number of TRS ports is fixed, e.g., one. Also, the CSI-RS port 0 to 7, described above, may be referred to as ports 15-22, respectively, in the 3GPP specifications.

In various embodiments, the TRS may also be used for other purposes, such as for RSRP measurement for the extension carrier. The TRS may also be used for frequency tracking purposes in addition to time tracking.

In various embodiments of the present disclosure, the UE can be configured with CSI-RS that can be used for DL time tracking purposes. The CSI-RS pattern used for time tracking may include the following characteristics: the CSI-RS is a wideband signal, the frequency domain density is at least 1 RE for every 6 REs, and the spacing between CSI-RS REs is regular in frequency. In Rel-10, 1, 2, 4, or 8 CSI-RS ports can be configured per cell for CSI measurement purposes. In various embodiments, only 1 CSI-RS port or a subset of CSI-RS ports configured for CSI measurement purposes may be configured for time tracking purposes.

The CSI-RS mapping and sequence may be determined by configuration parameters that comprise the following fields: resourceConfig, subframeConfig, antennaPortCount, and virtualCellID. In various embodiments, the UE is configured with multiple sets of CSI-RS configurations. For example, the CSI-RS configuration may include a first configuration with at least the following fields: resourceConfig=RC1, subframeConfig=SC1, antennaPortCount=APC1, and virtualCellID=VCID1. In another example, the CSI-RS configuration may include a second configuration with at least the following fields resourceConfig=RC2, subframeConfig=SC2, antennaPortCount=APC2, and virtualCellID=VCID1.

For example, the first CSI-RS configuration may be used for CSI measurement purposes, and the second CSI-RS configuration is additionally configured by the network to assist the UE in time tracking. A UE may recognize that the second CSI-RS configuration is configured to assist the UE in time tracking if at least the following conditions are satisfied: 1) the first and second CSI-RS configurations have the same virtual cell id, 2) the SC1 and SC2 indicate the same subframe offset, and 3), which is optional, the RC1 and RC2 are such that the CSI-RS REs are located in the same set of OFDM symbols with the spacing of six REs in frequency. Note that the periodicities of CSI-RS subframes for the configurations may or may not be the same.

In some embodiments, when the first two conditions are met, the UE can furthermore assume that the two sets of CSI-RS configured by the two CSI-RS configurations are transmitted from the same set of CSI-RS antenna ports in the same transmission point. The UE may use this assumption to derive RSRP measurement and CSI.

In one example of deriving RSRP measurement, the UE measures and reports RSRP on CSI-RS REs for a first CSI-RS port (e.g., CSI-RS port zero), where the CSI-RS REs are the two sets of CSI-RS REs for the first CSI-RS port configured by the two CSI-RS configurations. In a second example, the UE measures and reports RSRP on CSI-RS REs for all CSI-RS ports, where the CSI-RS REs are the two sets of CSI-RS REs for the APC1 ports and for the APC2 ports configured by the two CSI-RS configurations. In a third example, the UE measures and reports RSRP on CSI-RS REs for APC1 CSI-RS ports, where the CSI-RS REs are the two sets of CSI-RS REs for the APC1 ports configured by the two CSI-RS configurations.

In one example of deriving CSI, the UE estimates CSI utilizing all the available observations of each antenna port's channels. For example, when APC1=APC2=1, the UE estimates channels of antenna port zero using the signals received on the two sets of CSI-RS REs for antenna port zero configured by the two CSI-RS configurations. In another example, when APC1=2 and APC2=1, the UE estimates channels of antenna port zero, using the signals received on the two sets of CSI-RS REs for antenna port 0 configured by the two CSI-RS configurations; while the UE estimates channels of antenna port one, using the signals received on the one set of CSI-RS REs for antenna port one configured by the first CSI-RS configuration. In a second example of deriving CSI, the UE estimates CSI utilizing only the CSI-RS configured by the first CSI-RS configuration.

Figure 13:
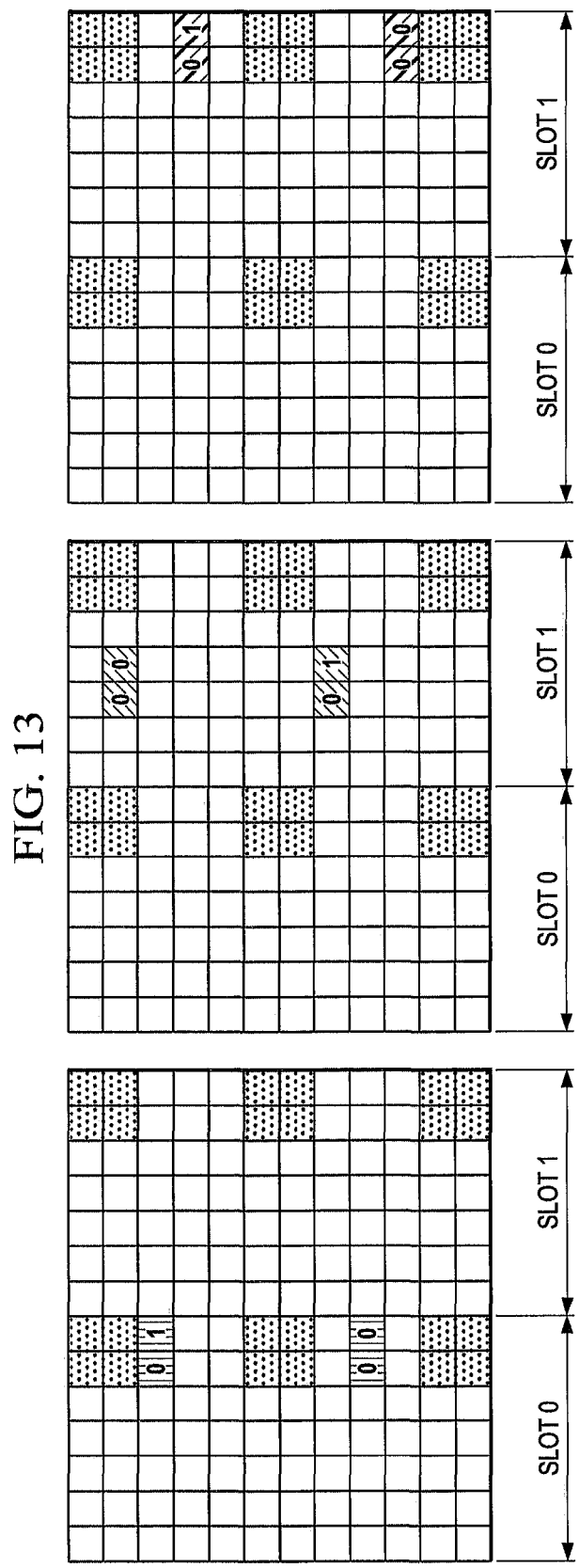
FIG. 13 illustrates examples of an effective CSI-RS mapping seen by the UE when configured with 2-port CSI-RS+ 1-port CSI-RS in accordance with various embodiments of the present disclosure.

Upon recognizing that the second CSI-RS configuration is configured to assist the UE in time tracking, the UE assumes that additional REs are allocated by the network for the CSI-RS ports indicated by the second CSI-RS configuration. For example, in case both APC1 and APC2 are 1, the UE uses the CSI-RS port 0 configured in the first CSI-RS configuration and the second CSI-RS configuration for time tracking purposes. Several examples of the effective CSI-RS mapping in the CSI-RS subframe seen by the UE when configured with 2-port CSI-RS+1-port CSI-RS and 2-port CSI-RS+2-port CSI-RS are illustrated in FIGS. 13 and 14, respectively.

Figure 15:
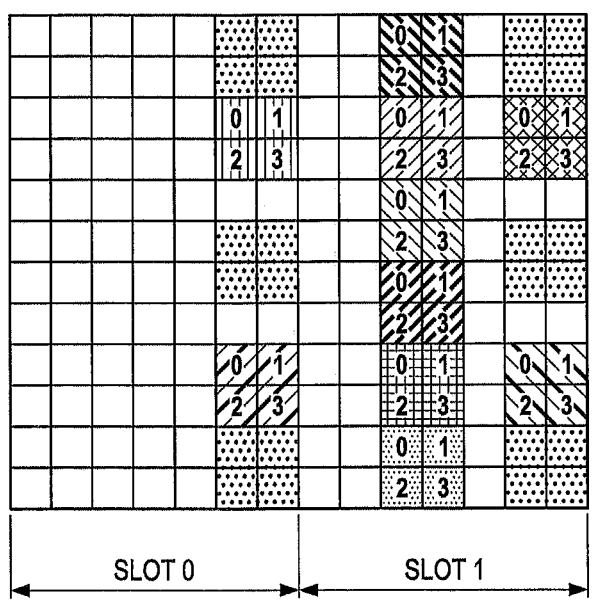
FIG. 15 illustrates examples of possible configurations for a 4-port CSI-RS pattern in accordance with various embodiments of the present disclosure.
Figure 16:
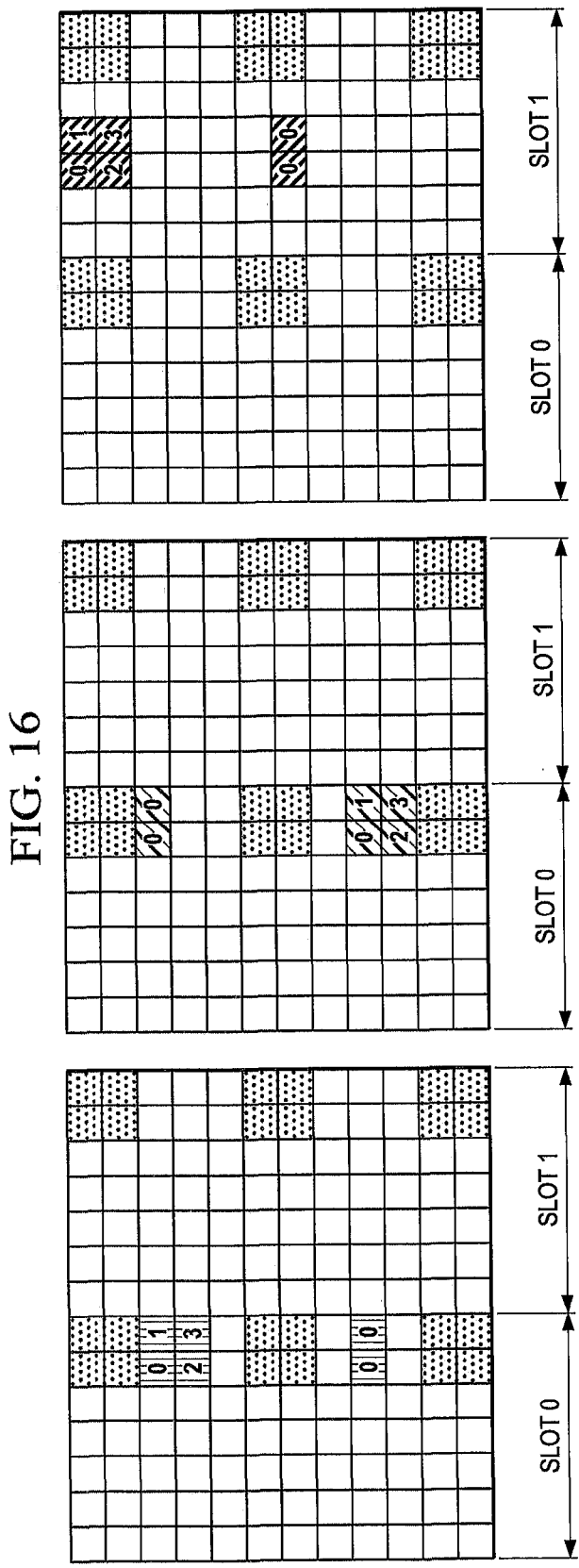
FIG. 16 illustrates examples of an effective CSI-RS mapping seen by the UE when configured with 4-port CSI-RS+ 1-port CSI-RS in accordance with various embodiments of the present disclosure.

FIG. 15 illustrates examples of possible configurations for a 4-port CSI-RS pattern in accordance with various embodiments of the present disclosure. In these illustrative embodiments, when one of the CSI-RS configurations corresponds to 4 CSI-RS ports, the CSI-RS pattern for 4 ports, as shown in FIG. 15, is assumed by the UE. This CSI-RS pattern for 4 ports is different from the Rel-10 pattern. The CSI-RS pattern is designed so that the CSI-RS resources configured for time tracking purpose can satisfy the desirable characteristics of signals used for time tracking. In particular, referring to FIG. 16, it can be seen that CSI-RS port 0 satisfy the required frequency density and regular RE spacing. As illustrated in FIGS. 15 and 16, (0, 1) is a CDM group of port 0 and port 1; (2, 3) is a CDM group of port 2 and port 3; and each of the different numbered shadings is a possible configuration.

Figure 17:
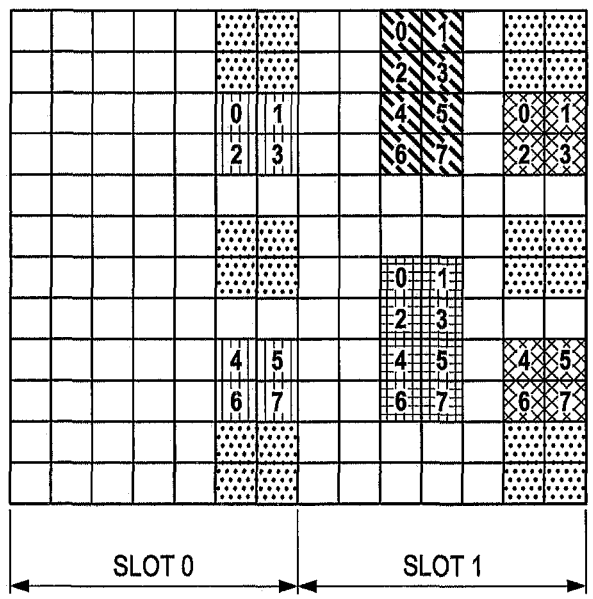
FIG. 17 illustrates examples of possible configurations for 8-port CSI-RS mapping for extension carriers in accordance with various embodiments of the present disclosure.
Figure 18:
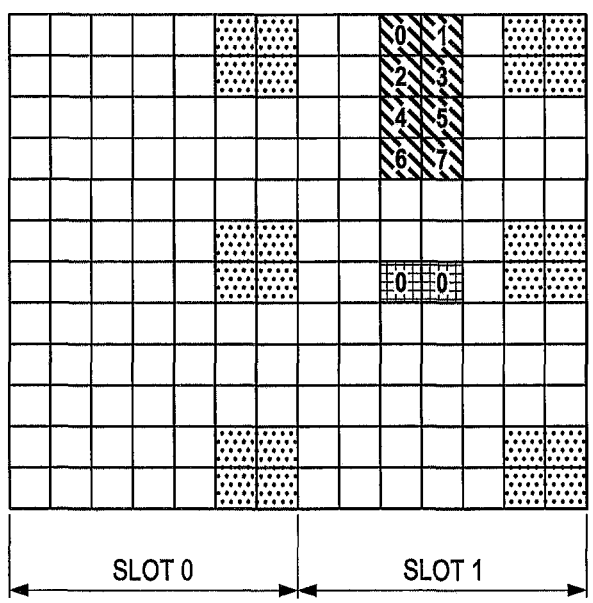
FIG. 18 illustrates an example of an effective CSI-RS mapping seen by the UE when configured with 8 ports+1 port in accordance with various embodiments of the present disclosure.

FIG. 17 illustrates examples of possible configurations for 8-port CSI-RS mapping for extension carriers in accordance with various embodiments of the present disclosure. In these illustrative embodiments, when one of the CSI-RS configurations corresponds to 8 CSI-RS ports, the CSI-RS pattern for 8 ports, as shown in FIG. 17, is assumed by the UE. This CSI-RS pattern for 8 ports is different from the Rel-10 pattern. The CSI-RS pattern is designed so that the CSI-RS resources configured for time tracking purposes can satisfy the desirable characteristics of signals used for time tracking. In particular, referring to FIG. 18, it can be seen that CSI-RS port zero satisfies the required frequency density and regular RE spacing. As illustrated in FIGS. 17 and 18, (0, 1) is a CDM group of port 0 and port 1; (2, 3) is a CDM group of port 2 and port 3, etc.; and each of the different numbered shadings is a possible configuration.

In some embodiments, the UE may not use the additional CSI-RS resources for CSI-RS measurement. For example, the UE may use only the CSI-RS configured in first CSI-RS configuration for CSI-RS measurement. This ensures that the CSI-RS measurement quality is uniform across ports.

In other embodiments, the UE also uses the additional CSI-RS resources for CSI-RS measurement. To enable equal measurement opportunity on each port, the port index corresponding to the second CSI-RS configuration can cycle from port 0, to 1, and back and forth in time. The port used for time tracking also can cycle from port 0, to 1, and back and forth.

Figure 19:
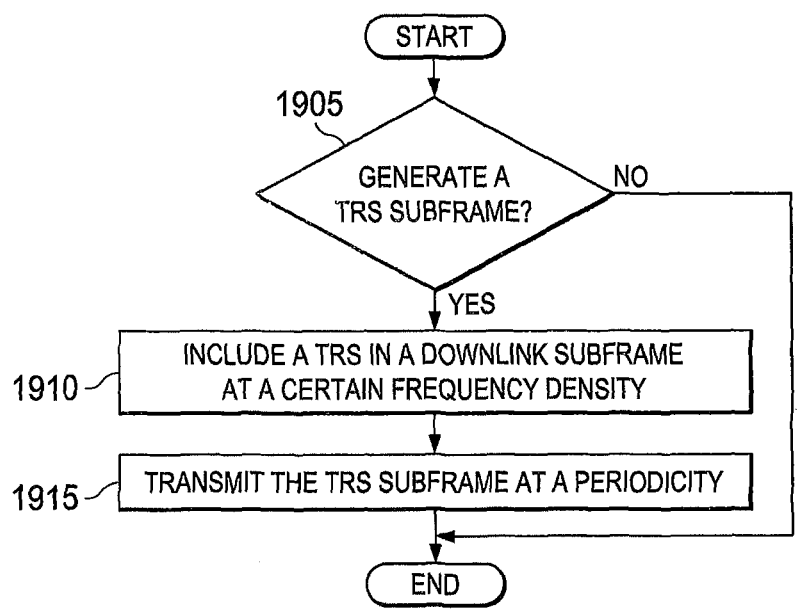
FIG. 19 illustrates a process for including a tracking reference signal in a downlink subframe in accordance with various embodiments of the present disclosure.

FIG. 19 illustrates a process for including a tracking reference signal in a downlink subframe in accordance with various embodiments of the present disclosure. For example, the process depicted in FIG. 19 may be performed by the controller 425 and the TX processing circuitry 410 in FIG. 4. The process may also be implemented by the base station 102 in FIG. 1.

The process begins by determining whether to generate a TRS subframe (step 1905). For example, in step 1905, the process may determine whether the CRS is absent in one or more downlink subframes and determine to generate the TRS subframe to include the TRS in response to determining that the CRS is absent in the one or more downlink subframes. In another example, the process may determine whether a time density and/or a frequency density of the CSI-RS for time and/or frequency tracking by the UE exceeds a threshold. For example, the frequency density may be too low to achieve sufficient time or frequency tracking. The process may determine to generate the TRS subframe to include the TRS in response to determining that at least one of the time density or the frequency density of the CSI-RS does not exceed the threshold. In step 1905, the determination may be made by a base station in determining to use a new extension carrier or performed dynamically based on signal conditions.

In response to determining to generate the TRS subframe, the process then includes a TRS in a downlink subframe at a certain frequency density (step 1910). For example, in step 1910, the process may include the TRS in the downlink subframe on a port (e.g., port 0) for a cell-specific reference signal (CRS). In another example, the process may configure the TRS in the downlink subframe independently of a CSI-RS included in the downlink subframe. A pattern of the TRS in the TRS subframe may be the same as that of a CSI-RS port (e.g., port 0) with increased frequency density and regular spacing between resource elements of the TRS in the TRS subframe. In other examples, the pattern of the TRS in the TRS subframe may be a collection of multiple CSI-RS port patterns.

The process then transmits the TRS subframe at a periodicity (step 1915). For example, in step 1915, the process may transmit the TRS at a periodicity of the TRS subframe among the other subframes of every five milliseconds or one TRS subframe in every five subframes. Once transmitted, the TRS subframe may be received by an UE that can extract the TRS and use the TRS to achieve and/or maintain timing and/or frequency tracking and/or synchronization for wireless communication.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for including a tracking reference signal (TRS) in a downlink subframe, the method comprising:
   determining whether at least one of a time density or a frequency density of a channel-state-information reference signal (CSI-RS), included in the downlink subframe for at least one of time or frequency tracking by an user equipment, exceeds a threshold;
   generating, in response to determining that the at least one of the time density or the frequency density of the CSI-RS does not exceed the threshold, a TRS subframe by including the TRS in the downlink subframe at a frequency density of at least one resource element per six resource elements in the TRS subframe, the frequency density of the TRS in the downlink subframe configured for timing or frequency tracking by a user equipment, wherein generating the TRS subframe comprises configuring the TRS in the downlink subframe independently of the CSI-RS included in the downlink subframe; and
   transmitting the TRS subframe at a periodicity among other subframes not including the TRS.

2. The method of claim 1, wherein generating the TRS subframe comprises generating the TRS subframe by including the TRS in the downlink subframe on a port for a cell-specific reference signal (CRS).

3. The method of claim 2 further comprising:
   determining whether the CRS is absent in one or more downlink subframes,
   wherein generating the TRS subframe comprises generating the TRS subframe to include the TRS in response to determining that the CRS is absent in the one or more downlink subframes.

4. The method of claim 1, wherein a pattern of the TRS in the TRS subframe is that of a CSI-RS port with increased frequency density and regular spacing between resource elements of the TRS in the TRS subframe.

5. The method of claim 1, wherein a pattern of the TRS in the TRS subframe is a collection of multiple CSI-RS port patterns.

6. The method of claim 1, wherein a density of the TRS in the TRS subframe is expressly indicated in a one-bit field in configuration information.

7. The method of claim 1, wherein a density of the TRS in the TRS subframe is implicitly indicated by a type of carrier used to transmit the TRS subframe.

8. The method of claim 1, wherein the periodicity of the TRS subframe among the other subframes is at least one of one TRS subframe every five milliseconds or one TRS subframe in every five subframes.

9. An apparatus in a base station configured to include a tracking reference signal (TRS) in a downlink subframe, the apparatus comprising:
a controller configured to determine whether at least one of a time density or a frequency density of a channel-state-information reference signal (CSI-RS), included in the downlink subframe for at least one of time or frequency tracking by an user equipment, exceeds a threshold;
transmitter processing circuitry configured to generate, in response to a determination that the at least one of the time density or the frequency density of the CSI-RS does not exceed the threshold, a TRS subframe by including the TRS at a frequency density of at least one resource element per six resource elements in the TRS subframe, the frequency density of the TRS in the downlink subframe configured for timing or frequency synchronization by a user equipment, and to configure the TRS in the downlink subframe independently of the CSI-RS included in the downlink subframe; and
one or more antennas configured to transmit the TRS subframe at a periodicity among other subframes not including the TRS.

10. The apparatus of claim 9, wherein the transmitter processing circuitry is configured to generate TRS subframe by including the TRS in the downlink subframe on a port for a cell-specific reference signal (CRS).

11. The apparatus of claim 10 further comprising:
a controller configured to determine whether the CRS is absent in one or more downlink subframes,
wherein the transmitter processing circuitry is configured to generate the TRS subframe to include the TRS in response to a determination that the CRS is absent in the one or more downlink subframes.

12. The apparatus of claim 9, wherein a pattern of the TRS in the TRS subframe is that of a CSI-RS port with increased frequency density and regular spacing between resource elements of the TRS in the TRS subframe.

13. The apparatus of claim 9, wherein a pattern of the TRS in the TRS subframe is a collection of multiple CSI-RS port patterns.

14. The apparatus of claim 9, wherein a density of the TRS in the TRS subframe is expressly indicated in a one-bit field in configuration information.

15. The apparatus of claim 9, wherein a density of the TRS in the TRS subframe is implicitly indicated by a type of carrier used by the base station to transmit the TRS subframe.

16. The apparatus of claim 9, wherein the periodicity of the TRS subframe among the other subframes is at least one of one TRS subframe every five milliseconds or one TRS subframe in every five subframes.

17. An apparatus in a user equipment configured to identify a tracking reference signal (TRS) in a downlink subframe, the apparatus comprising:
one or more antennas configured to receive a TRS subframe at a periodicity among other subframes not including the TRS;
receiver processing circuitry configured to identify the TRS in the TRS subframe; and
a controller configured to perform at least one of frequency or timing tracking using the TRS,
wherein a frequency density of the TRS in the TRS subframe is at least one resource element per six resource elements,
wherein at least one of a time density or a frequency density of a channel-state-information reference signal (CSI-RS) is determined not to exceed a threshold,
wherein the TRS is configured in the downlink subframe independently of the CSI-RS included in the downlink subframe, and
wherein the TRS subframe is generated to include the TRS in response to the at least one of the time density or the frequency density of the CSI-RS included in the downlink subframe not exceeding the threshold.

18. The apparatus of claim 17, wherein the TRS is included on a port for a cell-specific reference signal (CRS) in the downlink subframe.

19. The apparatus of claim 17, wherein the periodicity of the TRS subframe among the other subframes is at least one of one TRS subframe every five milliseconds or one TRS subframe in every five subframes.

20. The apparatus of claim 17, wherein the controller is configured to process the TRS to achieve or maintain timing or frequency synchronization for wireless communication by the UE.

* * * * *